M. MERKEL.
HARROW.
APPLICATION FILED AUG. 17, 1911.

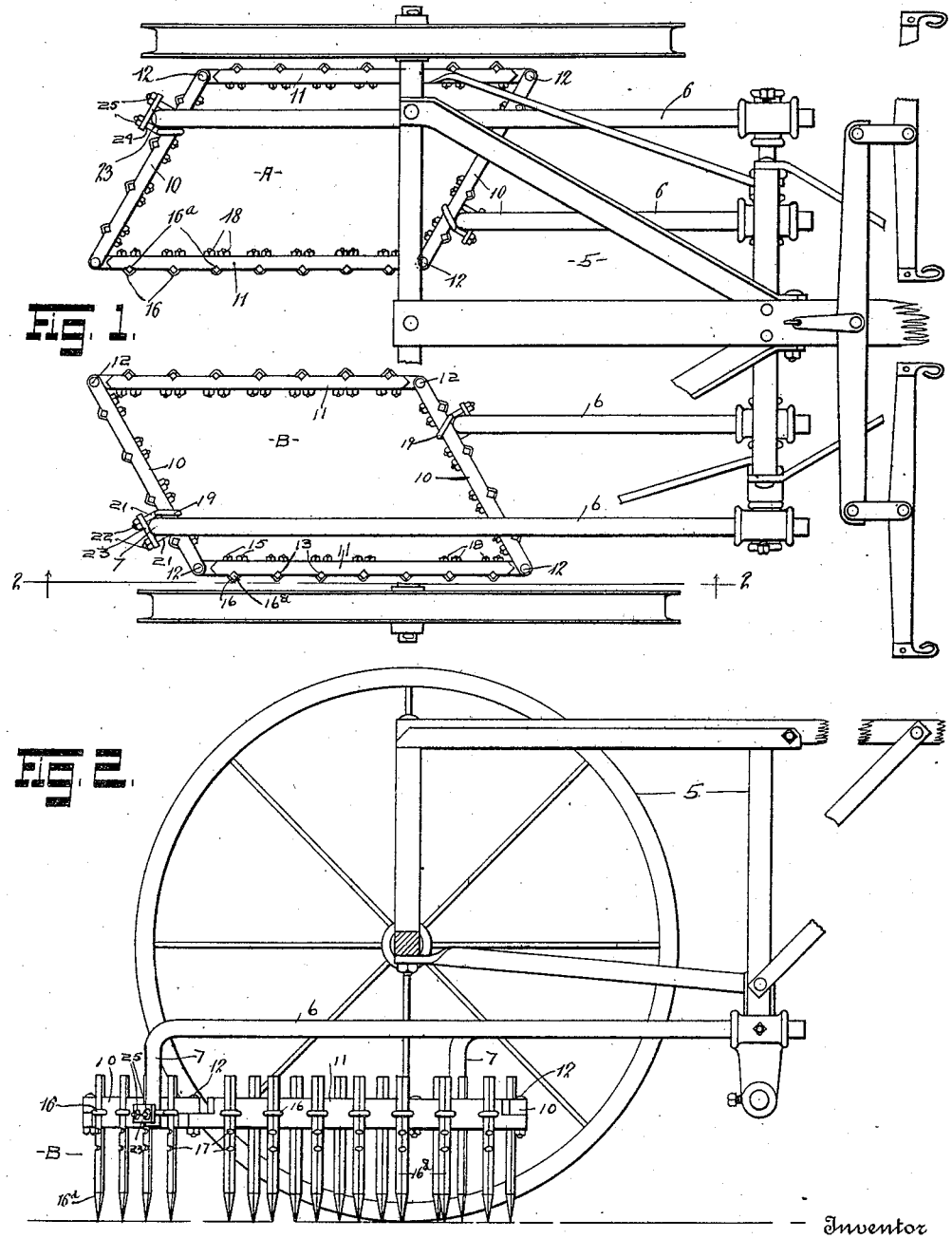

1,023,436.

Patented Apr. 16, 1912.
2 SHEETS—SHEET 2.

Witnesses

Inventor
M. Merkel,
By
Attorneys

UNITED STATES PATENT OFFICE.

MARTIN MERKEL, OF CELESTINE, INDIANA.

HARROW.

1,023,436.  Specification of Letters Patent.  Patented Apr. 16, 1912.

Application filed August 17, 1911. Serial No. 644,523.

*To all whom it may concern:*

Be it known that I, MARTIN MERKEL, a citizen of the United States, residing at Celestine, in the county of Dubois, State of Indiana, have invented certain new and useful Improvements in Harrows; and I do hereby declare the following to be a full, clear, and exact description of the invention, such as will enable others skilled in the art to which it appertains to make and use the same.

This invention relates to an improvement in harrows generally, although the invention is more in the nature of an attachment for wheeled cultivator frames.

The principal object of the invention is to provide an adjustable harrow frame adapted for attachment to the cultivator standards of the cultivator frame.

Another object of the invention is to provide a means for attaching the harrow to the standards as above described, whereby the harrow frame may be held in any predetermined adjusted relation.

A further object of the invention is to provide a harrow frame of a minimum number of parts, it being therefore simple in construction and cheap to manufacture.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction within the scope of the claims may be referred to without departing from the spirit or sacrificing any of the advantages of the invention.

Figure 3:
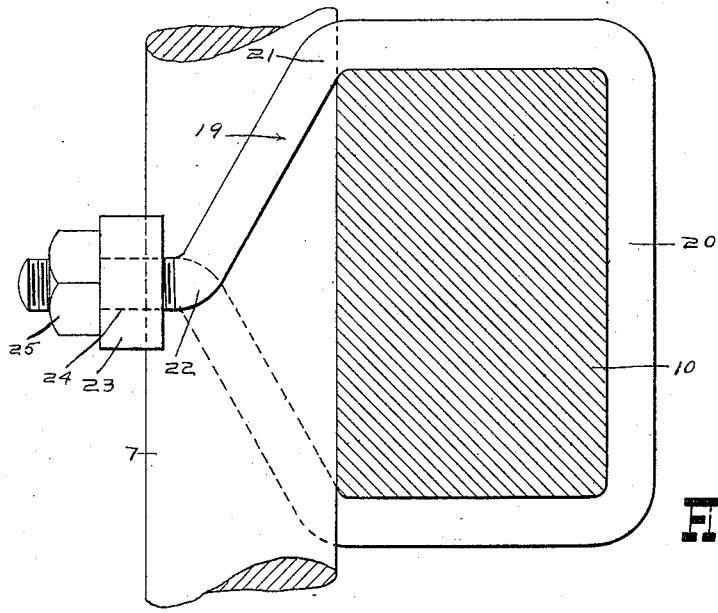
Figure 4:
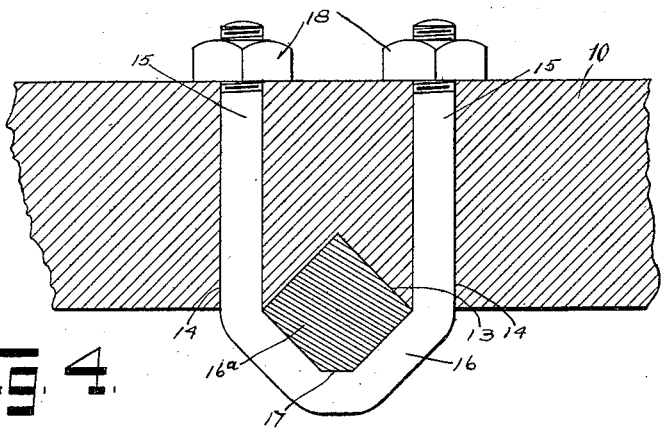

In the drawing: Figure 1 is a top plan view of a double row wheeled cultivator showing my improved harrow attached thereto, parts of the cultivator being broken away to clearly show the connections with the harrows, Fig. 2 is a vertical section through Fig. 1 taken on the line 2—2 thereof, Fig. 3 is an enlarged detail view showing one of the connections between the harrows and one of the cultivator standards, Fig. 4 is a detail sectional view through one of the frame members showing the means for securing a harrow thereto.

Like reference numerals designate corresponding parts in all the figures of the drawings.

Referring to the drawings, 5 designates a double row cultivator of any suitable wheel type. This cultivator includes the usual spaced arms 6—6 which terminate in the usual standards 7 adapted for attachment with ordinary cultivator shovels (not shown).

My invention comprises a pair of harrows, designated by the reference letters A and B respectively, each of said harrows being adapted to be attached to the cultivator standards 7 in a manner hereinafter more fully described. Each harrow consists of an angular frame comprising end members 10—10 and side members 11—11, which are pivotally connected at their adjacent ends by means of pins 12. Each of these members is angular in cross section, and formed in the outer face thereof is a plurality of spaced vertical V-shaped recesses 13. Also formed in each member and on opposite sides of each recess are spaced transverse openings 14—14. Disposed within each pair of these openings are the legs 15—15 of a U-shaped bolt, the bight 16 thereof being bent to a V-shaped formation and disposed opposite the recess 13, whereby said bight and the recess conjointly form an angular seat adapted to receive an angular spike $16^a$ of a corresponding size. This spike is also formed with a plurality of spaced notches 17 adapted to be engaged by the bight 16 of said bolt. Nuts 18 are associated with the free ends of the U-bolt for drawing the bight, and thereby clamping a spike between the bight and the frame member, said notch 17 coacting with the bight of the bolt to interlock the spike from vertical movement.

In order to attach the harrow frames A and B to the cultivator, I have provided a plurality of attaching clips. Each of these clips consists of a bolt 19 having its central portion bent in angular formation, as indicated by the reference numeral 20, and of a size to engage around the respective end member of the harrow frame. The end portions 21 of the bolt which bear against the outer face of the respective frame member are oppositely bent and terminate in forwardly directed threaded end portions 22, which are disposed in a plane parallel to the longitudinal axis of said adjacent frame member. It will thus be observed that the ends 22—22 are respectively disposed on opposite sides of a respective cultivator standard 7. In order to secure the clips to the standard, I have provided a plate 23 which is formed with a pair of spaced openings 24—24 for receiving the ends of said clip. Nuts 25—25 are associated with the threaded ends of the bolt for clamping said parts together.

From the foregoing, it will be observed that the harrow frame may be adjusted to a more or less width, as may be desired, and the said frame may be held in any adjusted position by adjusting the positions of the clips on said frame. It will also be observed in this connection that the central portion of the clips is disposed between a pair of adjacent spikes and therefore the spikes positively prevent any longitudinal movement of said frame members with respect to the cultivator standards. By this means, it will be observed that said frame can be held rigidly in any adjusted position.

What is claimed is:—

1. In combination with a cultivator frame including a plurality of cultivator standards, a plurality of harrow frames each including end and side members, and means connected to the end members for rigidly connecting said frames to the standards.

2. In combination with a cultivator frame including a plurality of cultivator standards, a harrow frame including pivotally connected side and end members, and means each adjustably connected to the end members for rigidly connecting said frame to a certain pair of standards.

3. In combination with a cultivator frame including a plurality of cultivator standards, a harrow frame including pivotally connected side and end members, spikes carried by said members, and separate means each adjustably connected to the end members between a pair of spikes for rigidly connecting said frame to a certain pair of standards.

4. A harrow attachment for cultivator frames including a plurality of cultivator standards, consisting of a frame including end and side members, and means engageable with the end members for rigidly connecting the frame to a pair of standards.

5. A harrow attachment for cultivator frames including a plurality of cultivator standards consisting of a frame including end and side members, and means each adjustably connected to the end members for rigidly connecting said frame to a certain pair of standards.

6. A harrow attachment for cultivator frames including a plurality of cultivator standards, consisting of a frame including end and side members, spikes carried by said members, and separate means each adjustably connected to the end members between a pair of spikes for rigidly connecting said frame to a certain pair of standards.

7. A harrow attachment for cultivator frames including a plurality of cultivator standards, consisting of a frame including end and side members, means engageable with the end members for rigidly connecting the frame to a pair of standards, said means each comprising a clip consisting of a bolt having its central portion bent in angular formation and disposed around the respective member of the frame, the end portions of the bolt bearing against the outer face of the respective frame member in opposite directions, said end portions terminating in forwardly extending ends disposed in a plane parallel to the longitudinal axis of said frame member and on opposite sides of the standard, a plate connected to the ends of the bolt opposite the frame, and means engageable with the threaded ends of the bolt for securing the clip to the standard.

In testimony whereof, I affix my signature, in presence of two witnesses.

MARTIN MERKEL.

Witnesses:
JOSEPH HASENOUR,
J. H. SING.

---

Copies of this patent may be obtained for five cents each, by addressing the "Commissioner of Patents, Washington, D. C."